(12) United States Patent
Kaushik

(10) Patent No.: US 11,129,099 B2
(45) Date of Patent: Sep. 21, 2021

(54) MOBILE DEVICE BATTERY OPTIMIZATION FOR PROCESSING LOCATION BEACONS USING MOBILE INBUILT SENSORS

(71) Applicant: Fortinet, Inc., Sunnyvale, CA (US)

(72) Inventor: Anil Kaushik, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 15/859,592

(22) Filed: Dec. 31, 2017

(65) Prior Publication Data

US 2019/0208468 A1 Jul. 4, 2019

(51) Int. Cl.
*H04W 52/02* (2009.01)
*H04W 4/02* (2018.01)
*H04W 8/00* (2009.01)
*H04W 40/24* (2009.01)
*H04W 76/14* (2018.01)
*H04W 4/80* (2018.01)

(52) U.S. Cl.
CPC ....... *H04W 52/0229* (2013.01); *H04W 4/023* (2013.01); *H04W 4/80* (2018.02); *H04W 8/005* (2013.01); *H04W 40/244* (2013.01); *H04W 76/14* (2018.02)

(58) Field of Classification Search
CPC .......................... H04W 4/021; H04W 52/0229
See application file for complete search history.

(56) References Cited

U.S. PATENT DOCUMENTS

| 2016/0012214 A1* | 1/2016 | Jones ................. G06F 21/629 726/2 |
| 2017/0228953 A1* | 8/2017 | Lupovici ............ G07C 9/00309 |
| 2017/0289280 A1* | 10/2017 | Wang ...................... H04L 67/18 |

* cited by examiner

*Primary Examiner* — Hsinchun Liao

(74) *Attorney, Agent, or Firm* — Law Office of Dorian Cartwrigh; Dorian Cartwright

(57) ABSTRACT

A battery saving controller toggles between a normal mode and a battery saving mode which selectively processing location beacons using mobile inbuilt sensors. Bluetooth location beacons are periodically sent by nearby Bluetooth location devices for updating a current location of mobile devices. Battery power within the mobile devices is selectively used for processing the location beacon. The processing exposes the unique tag id from Bluetooth LE data packets, and determines the RSSI value of the data packets received from Bluetooth devices. The battery saving controller deactivates location beacon processing to save power usage from the battery, responsive to detecting identical packets over a time interval. Additionally, the battery saving controller reactivates location beacon responsive to at least one of the sensors inbuilt to the mobile device detecting movement of the mobile device.

5 Claims, 6 Drawing Sheets

MOBILE DEVICE BATTERY OPTIMIZATION FOR PROCESSING LOCATION BEACONS USING MOBILE INBUILT SENSORS

FIELD OF THE INVENTION

The invention relates generally to computer hardware, and more specifically, to optimizing mobile device batteries for processing location beacons using mobile inbuilt sensors.

BACKGROUND

Many mobile computing devices, such as smartphones, determine current location via Bluetooth LE tags in particular when GPS satellites are blocked indoors or when higher accuracy than GPS is needed. The Bluetooth LE tags are periodically transmitted from static locations where Bluetooth transmitters can be placed and their known location registered. The Bluetooth transmitters are low power and low cost, thereby allowing them to be easily placed around a grocery store, business offices, along public roads, or other locations. Because the radio frequency range of Bluetooth LE transmitters is relatively small, the current location of the smartphone within radio range can be determined more precisely.

As a mobile device is in motion, it comes within radio range of different Bluetooth transmitters at known locations. Client software executing on the smartphone process the Bluetooth LE tags and submit exposed tag identification data to a backend server which knows the location of each Bluetooth transmitter. RSSI (Received Signal Strength Indication) readings help determine how far away the smartphone is from each Bluetooth transmitter. As a result, the current location can be isolated to a particular diameter encircling the Bluetooth transmitter. A second Bluetooth LE tag device which can be sensed at the same location results in to overlapping diameters, one encircling each Bluetooth transmitter, and the current location can be isolated to the intersection of the two diameters. A third Bluetooth LE tag provides even more accuracy, and so on. As the smartphone moves, new Bluetooth transmitters are identified in order to update the current location.

However, although stationary Bluetooth LE transmitters are low power, the smartphone inefficiently consumes battery power by constantly scanning for beacons. A use may experience degraded app and hardware performance when battery power is low. This is unnecessary because many times, a smartphone stays in the same location for long periods of time, so location updates are not necessary. But if the scanning is manually turned off or reduced in frequency in order to save power, subsequent movement prior to reactivating scanning will be detected as quickly or at all.

What is needed is a robust technique for selectively processing location beacons using mobile inbuilt sensors to optimize mobile device batteries responsive to actual movement.

SUMMARY

These shortcomings are addressed by the present disclosure of locationing methods, non-transitory computer readable mediums, and systems for selectively processing location beacons using mobile inbuilt sensors responsive to actual movement.

In one embodiment, transmission signals are received, via a first hardware network communications interface of the mobile device that is wirelessly coupled to the data communication network and powered by the battery. The transmission signals corresponding to a plurality of location beacons are periodically sent by a nearby location device. A location beacon contains a unique tag id that corresponds to a location that was previously configured.

In another embodiment, battery power is selectively used for processing the location beacon, via a battery saving controller coupled to a processor of the mobile device that is powered by the battery. The processing exposes the unique tag id from Bluetooth LE data packets, and determines the RSSI value of the data packets received from Bluetooth devices. The battery saving controller deactivates location beacon processing to save power usage from the battery, responsive to detecting identical packets over a time interval. Additionally, the battery saving controller reactivates location beacon responsive to at least one of the sensors inbuilt to the mobile device detecting movement of the mobile device.

The selective processing results can be transmitted to a locationing server, via a second hardware network communications interface powered by the battery. The transmission comprises selective processing results of at least the unique tag id associated with the location beacon and an RSSI value associated with the location beacon relative to the mobile device. After cloud-based processing, an estimated location is received from the location server based on the selective processing results, via the second hardware network communications interface. A location determined by the location server using the unique tag and the RSSI value. A current location of the mobile device is output to an application of the mobile device providing a service based on the current location.

Another embodiment monitors readings from the inbuilt sensors from a centralized, cloud monitoring server. The monitoring server can choose mobile devices, based on a current location, for requesting readings from inbuilt sensors while considering battery life or if certain devices are in battery saving mode.

Advantageously, battery power for mobile devices is conserved while continuing to provide location based services.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Battery saving systems, computer-implemented methods, and (non-transitory) computer-readable mediums that selectively processd location beacons using mobile inbuilt sensors, are described. For example, digital location-based coupons can be displayed to a customer walking around a grocery store, but when not in motion, battery power can be saved by cutting location updates until native sensors of a mobile device detect possible motion and reactive location updates for new digital coupon displays.

One of ordinary skill in the art will recognize, given the following disclosure, additional embodiments within the spirit of the present invention. For example, although Bluetooth LE is referred herein as the networking protocol for locationing techniques, Wi-Fi or other types of wireless technologies can be used for locationing as well.

Figure 2:
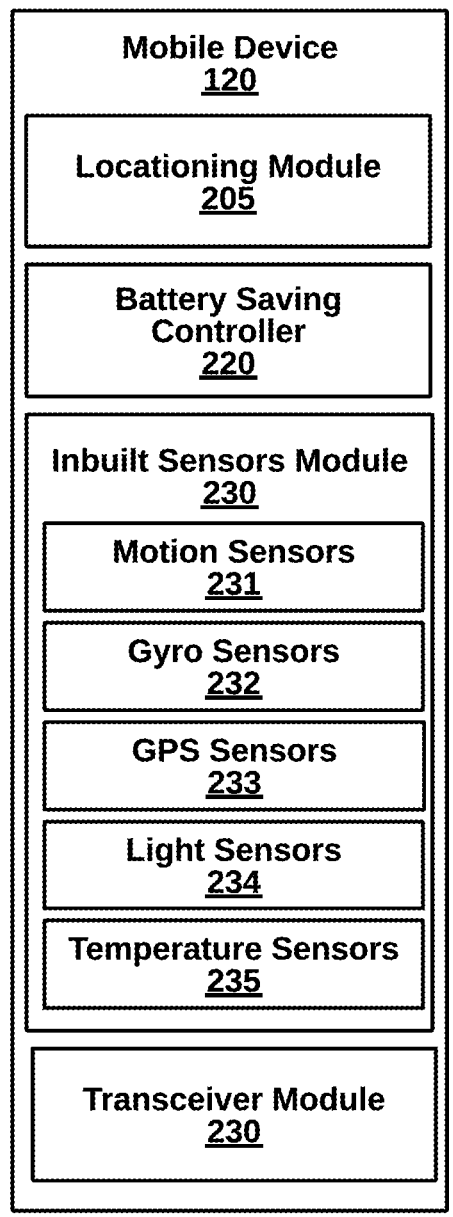
FIG. 2 is a block diagram illustrating a more detailed view of a mobile device of the system of FIG. 1, according to an embodiment.
Figure 3:
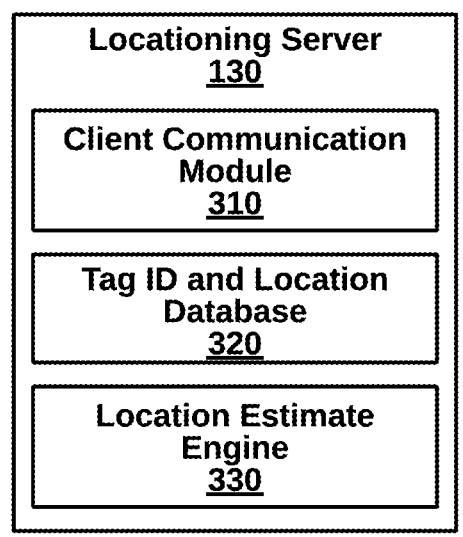
FIG. 3 is a block diagram illustrating a more detailed view of a locationing server of the system of claim 1, according to an embodiment.

I. Systems for Selective Using Battery Power for Processing Locationing Beacons (FIGS. 1-3)

Figure 1:
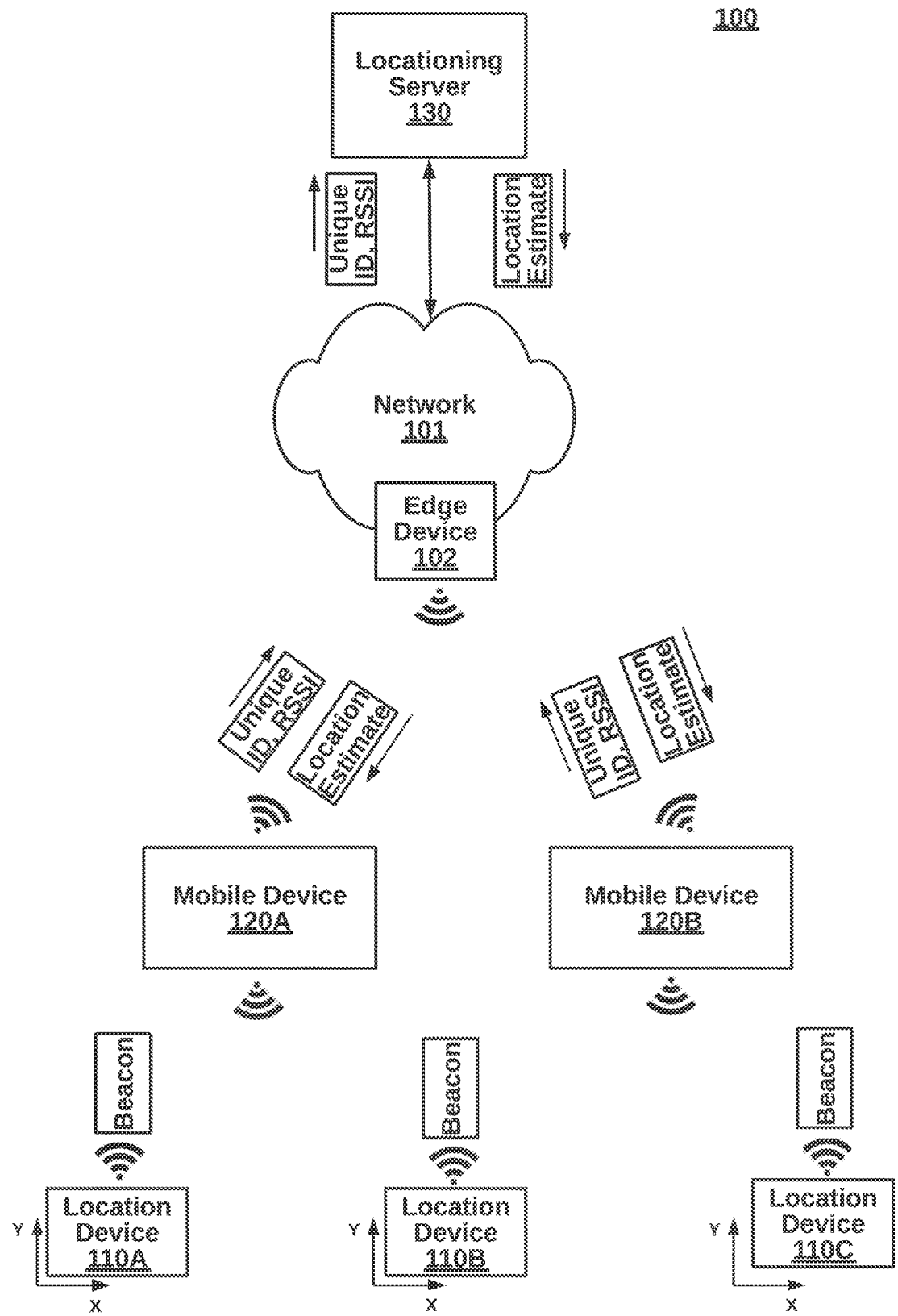
FIG. 1 is a block diagram illustrating a high-level view of a locationing system for selectively processing location beacons in a mobile device using mobile inbuilt sensors, according to an embodiment.

FIG. 1 is a block diagram illustrating a high-level view of a locationing system 100 for selectively processing location beacons in a mobile device using mobile inbuilt sensors, according to an embodiment. The system 100 primarily comprises location devices 110A-C, mobile devices 120A, B, and locationing server 130. The network components can be implemented as hardware, software, or a combination of both. Many other embodiments are possible, for example, with more mobile devices or different types of mobile devices.

The location devices A-C are wirelessly coupled to the mobile devices 120A,B over a Bluetooth data communication channel, which are in turn coupled to the locationing server 130 over network 101. The backend connection can be through an edge device 102 such as an access point, a router, a cell tower, or a satellite. The network can be, for example, the Internet, a WAN, a LAN, a 3G or 4G cellular data network, a hybrid network, or any other type of data communication network. Wireless components preferably use communication protocols such as IEEE 802.11 n and IEEE 802.11 ac wave 2, in addition to other protocols such as other IEEE 802.11s, IEEE 802.3, Bluetooth, 3G and 4G. The enterprise network can serve, for example, a business enterprise, a hospital or system of hospital, school, building, a private network, or the like. The enterprise network can be, for example, the Internet, a cellular network, a larger enterprise network to which the enterprise network is a smaller component of, or a combination of network types.

The location devices 110A-C periodically transmit location tags within beacons, such as Bluetooth LE tags, for nearby devices seeking location services. Each location device is programmed with a unique id which is embedded into a data field of location tags. The unique id is then programmed into the locationing server 130 for access by mobile devices in receipt of beacons. In one implementation, a bar code on the location device is scanned by a mobile device having GPS location ability in order to assign a location to a unique id of the location device. Some embodiments can have location devices that are also mobile (e.g., affixed to a robot or automobile), and those locations can be updated with a timestamp.

In one embodiment, the location device comprises a transmitter with a Bluetooth radio capable of wirelessly sending beacons over a radio frequency corresponding to Bluetooth or another protocol. One implementation of the location device is small form factor and low cost for low cost deployment. A plastic housing can have double sided tape for affixing to a stationary position (e.g., a wall, ceiling, or on a utility box) and a battery that will last a month, a year or longer. Other implementations of the location device can be a personal computer or other device with a processor and a Bluetooth transmitter. Some implementations of location-ing devices have several radios of differing protocols (e.g., Bluetooth and Wi-Fi radios).

The mobile devices 120A,B selectively update a current location, on an as-needed basis, in one implementation. In one embodiment, sensor readings of temperature or atmospheric pressure or the like are provided to a cloud-based monitor along with the current location. In normal mode, the mobile devices 120A,B continuously scan and update the current location. In battery save mode, the mobile devices 120A,B can continuously scan while the current location is changing. However, in situations in which the location does not change or changes slowly, such as when the mobile devices A,B are stationary or slow moving, the mobile devices A,B can throttle down scanning or temporarily discontinue scanning. Scanning can be reactivated temporarily or switched back to normal mode responsive to possible location changing situations, as detected by other sensors inbuilt to the mobile devices 120A,B, and active during battery save mode.

Location can serve many purposes for the mobile devices 120A,B. In one case, the location is used internally by an operating system for identifying GPS satellites, cell towner signals, and the like. In other cases, the location is passed to applications running on the operating system, such as a navigation app, a store coupon app, a ride sharing app, a weather app, or the like. Locations can also be reported to cloud-based servers or access points on the LAN that are tracking locations of the mobile devices 120A,B.

The mobile devices 120A,B can be implemented, for example, as a smartphone, a table computer, a Chromebook, an iPad, a laptop computer, a desktop computer, a networked appliance, an automobile, or any other type of mobile apparatus. Additional embodiments of the location devices 110 A-C are discussed below in association with FIG. 2.

The locationing server 130 outputs current locations responsive to one or more location tags uploaded by a mobile device. A transmission is received with a unique tag and an RSSI measurement. A database of tag ids is searched according to the unique ids in order to find the associated location. The RSSI measurement suggests how far away from the beaconing location that the tag was received. Generally, the weaker the RSSI, the farther away from a beacon transmission point. The RSSI measurement in one stance has a maximum value of 100 and has 101 different potential measurement levels, as determined by chipsets by Cistoc Systems or Atheros, for example. The location is estimated by the locationing server 130 using additional heuristics such as previous speed and direction of movement, in some embodiments.

In some embodiments, the locationing server 130 provides software as a service in the form or location updates to a large number of unassociated devices. The service can be provided directly to a location module of the operating system on the mobile device providing locations to apps running on the operating system. The service can also be provided to a higher-level app, such as Google Maps.

In another embodiment, the locationing server 130 commandeers location updates and/or sensor readings from mobile devices. For instance, temperature readings may be monitored and current battery power or battery saving modes may be considered when choosing which mobile devices to request readings from.

In some other embodiments, the locationing server 130 along with the location devices are all owned by a single entity and operated over an enterprise LAN. The locationing server 130 can be, for example, a FortiPresense device by Fortinet of Sunnyvale, Calif. More detailed embodiments of the locationing server 130 are set forth below with respect to FIG. 3.

FIG. 2 is a block diagram illustrating a more detailed view of a mobile device 120 (representative of the mobile devices 120A,B) of the system of FIG. 1, according to an embodiment. As shown, the mobile device 120 includes a locationing module 205, a battery saving controller 210, a battery 220, an inbuilt sensors module 230, and a transceiver module 240, coupled by a motherboard or other electronic chassis. Other components may be present depending upon the particular type of mobile device.

The locationing module 205 can be preinstalled or downloaded to the mobile device 120 for updating current locations using location beacons, as described herein, or other techniques. A scanner of the transceiver module 230 detects beacon over radio frequency transmissions and notifies the locationing module 205. A processor accesses a location beacon in memory and finds protocol-defined fields that define an offset for exposing unique ids of location tags. The processor can also calculate RSSI values from transceiver module 240.

The battery saving controller 210 can receive an input from various sources, causing it to toggle from normal mode to battery saving mode, and vice versa. In one example, a battery power level input is monitored and when the battery power falls below a predetermined threshold, battery saving mode is initiated. Battery saving mode can be implemented by the battery saving controller 210 by sending an electrical signal to the locationing module 250 putting it to sleep. In some embodiments, the battery saving module 210 changes a polling frequency. In other embodiments, the battery saving module 210 wakes up the locationing module 205 as needed.

The inbuilt sensors module 230 includes motion sensors 231, a gyro sensor 232, GPS sensors 233, light sensors 234 and temperature sensors 235. Many other sensors can be substituted. The sensors may also run off power from the battery 220, but while the locationing module 205 is in battery saving mode, power usage is reduced while maintaining location services within the mobile device 120. When a sensor detects conditions indicative of movement, the battery saving controller 210 can be notified. Responsive to changes in orientation, position, luminance, temperature, pressure, or the like, can be taken into consideration by the battery saving controller 210 for toggling modes, based on one or more factors. The inbuilt sensors module 230 can periodically poll certain sensors, or notification can be pushed, through the operating system.

The transceiver module 240 detects beacons with an antennae tuned into, for example, a frequency used for Bluetooth tags. The transceiver module 240 may also include a Wi-Fi radio or a 3G/4G radio for communicating with locationing servers.

FIG. 3 is a block diagram illustrating a more detailed view of a locationing server 130 of the system of claim 1, according to an embodiment. The locationing server 130 includes a client communication module 310 to register clients and ensure secure communications with clients of location update tags received and location estimates sent. A tag id and tag location database 320 stores known locations of tags for look-up in real time upon client requests. A location estimate engine 330 can use various algorithms to estimate a current location based on one or more of one or more tag ids, RSSI measurements, mobile device speed, mobile device trajectory, and any other implementation-specific factors. The mobile device can also share parts of the load in location estimates.

I. Methods for Selective Using Battery Power for Processing Locationing Beacons (FIGS. 4-5)

Figure 4:
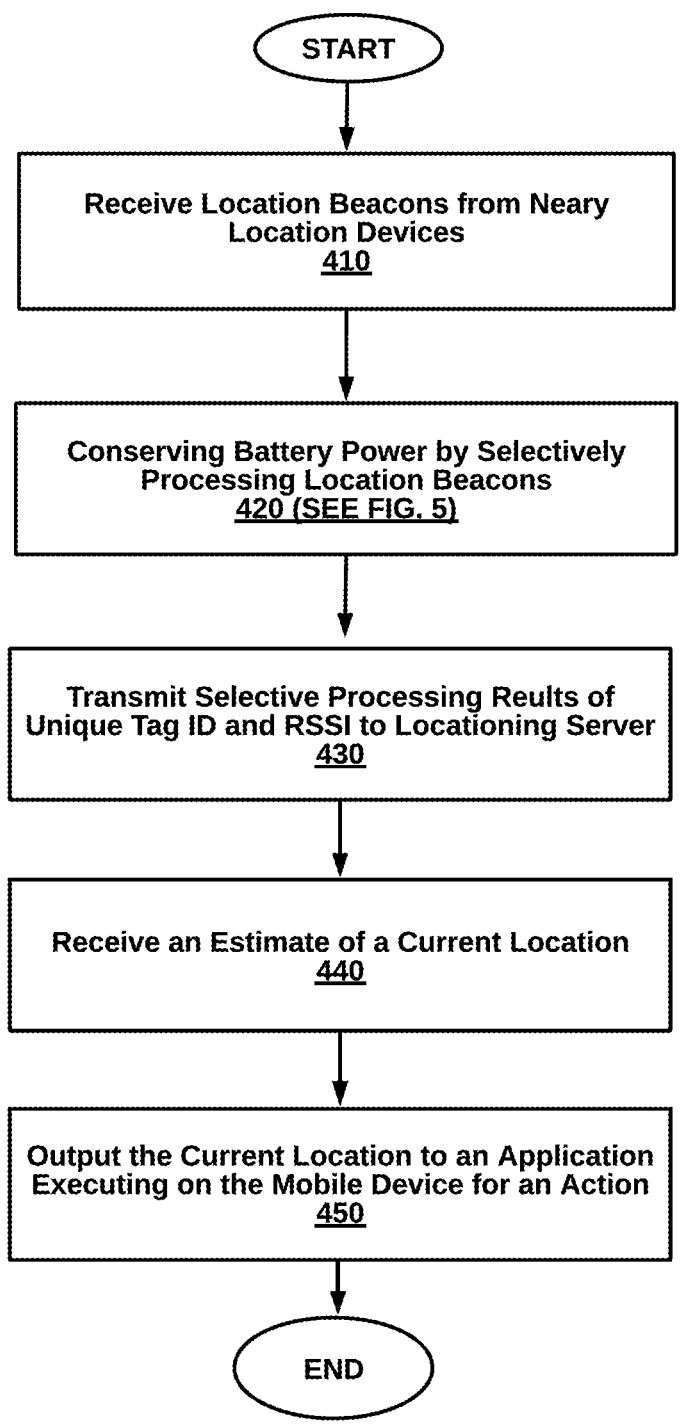
FIG. 4 is a flow chart illustrating a high-level view of a method for selectively processing location beacons in a mobile device using mobile inbuilt sensors, according to an embodiment.
Figure 5:
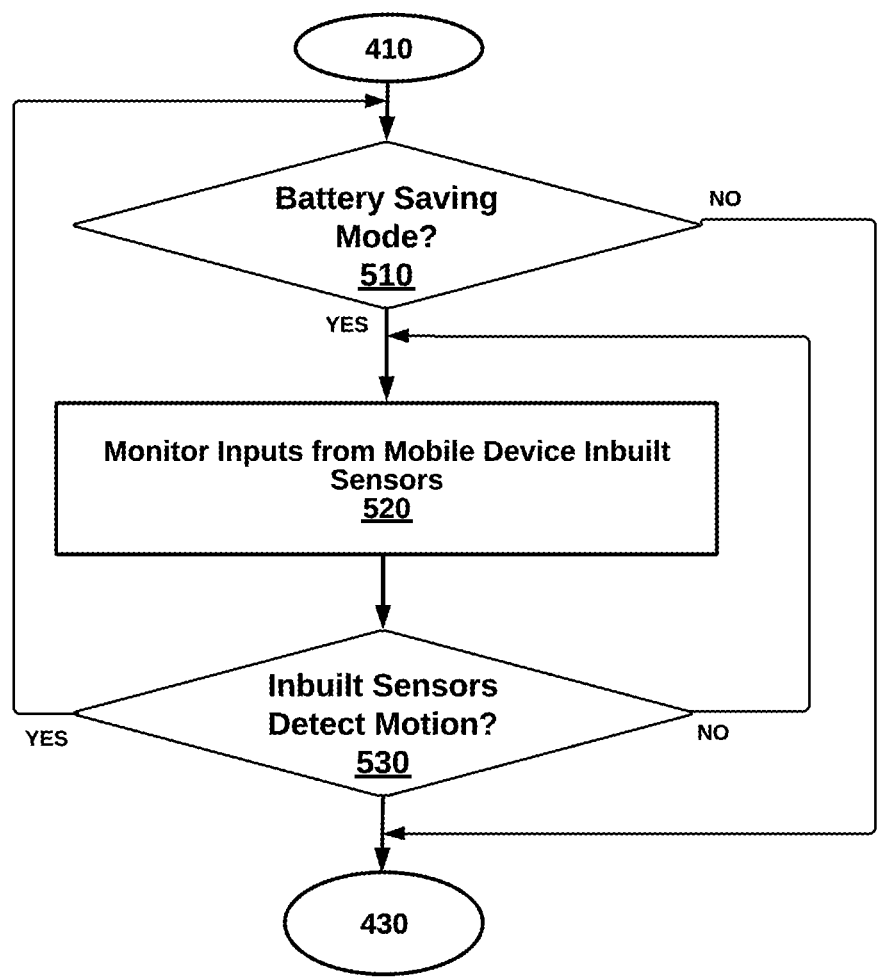
FIG. 5 is a flow chart illustrating a more detailed view of a step of selectively using battery power for processing location beacons, from the method of FIG. 4, according to an embodiment.

FIG. 4 is a flow chart illustrating a high-level view of a method 400 for selectively processing location beacons in a mobile device using mobile inbuilt sensors, according to an embodiment. The method 400 can be implemented, for example, in the system 100 of FIG. 1, or other systems.

At step 410, transmission signals are received, via a first hardware network communications interface of the mobile device that is wirelessly coupled to the data communication network and powered by the battery. The transmission signals corresponding to a plurality of location beacons are periodically sent by a nearby location device. A location beacon contains a unique tag id that corresponds to a location that was previously configured.

At step 420, battery power is selectively used for processing the location beacon, via a battery saving controller coupled to a processor of the mobile device that is powered by the battery. The processing exposes the unique tag id from Bluetooth LE data packets, and determines the RSSI value of the data packets received from Bluetooth devices. The battery saving controller deactivates location beacon processing to save power usage from the battery, responsive to detecting identical packets over a time interval. Additionally, the battery saving controller reactivates location beacon responsive to at least one of the sensors inbuilt to the mobile device detecting movement of the mobile device. While conserving power, location beacons ordinarily processed may be ignored altogether, or merely checked to see if unique tag ids are identical or changing.

At step 430, the selective processing results are transmitted to a locationing server, via a second hardware network communications interface powered by the battery. The transmission comprises selective processing results of at least the unique tag id associated with the location beacon and an RSSI value associated with the location beacon relative to the mobile device.

At step 440, a current location estimate is received from the location server based on the selective processing results, via the second hardware network communications interface. A location determined by the location server using the unique tag and the RSSI value.

At step 450, a current location of the mobile device is output to an application of the mobile device providing a service based on the current location. In one embodiment, the mobile device performs additional analysis from the estimated current location before finalizing a determination of the current location for output. Various actions can be taken depending upon the application.

FIG. 5 is a flow chart illustrating a more detailed view of the selectively processing step 430 of selectively using battery power for processing location beacons, from the method of FIG. 4, according to an embodiment.

At step 510, a mobile device operates normally to continuously scan for Bluetooth LE packets, process the packets, and transmit processing results to a locationing server, unless the mobile device is in battery saving mode. The battery saving controller toggles the mobile device into battery saving mode, either for the whole system or just locationing power use. Transitions from normal mode into battery saving mode, in some embodiments, are responsive to a low amount of power remaining in the battery, or responsive to being stationary for a certain amount of time, for instance. Location tags may be ignored or checked less frequently to save battery power.

In response to the battery save mode being active, at step 520, beacons are ignored and not processed. Inputs from inbuilt sensors are monitored. In response to, for example, the mobile device no longer being stationary, the battery save mode can be ended or modified, at step 530. The motion can be detected by one or more inbuilt sensors, such as the motion sensor, the GPS sensor, the gyro sensor, Wi-Fi locationing, RSSI measurements, or any other type of sensor.

III. Generic Computing Device (FIG. 6)

Figure 6:
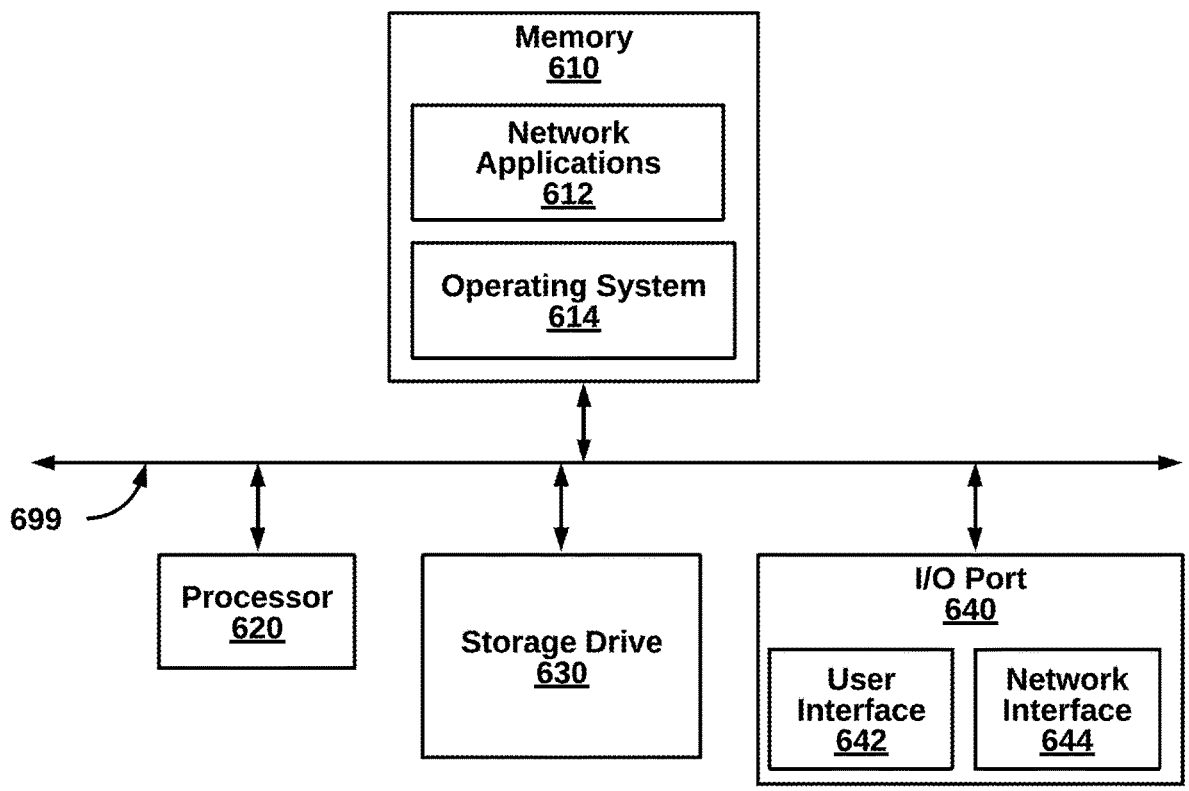
FIG. 6 is a block diagram illustrating an exemplary computing device, according to one embodiment.

FIG. 6 is a block diagram illustrating an exemplary computing device 600 for use in the system 100 of FIG. 1, according to one embodiment. The computing device 600 is an exemplary device that is implementable for each of the components of the system 100, including the location devices 110A-C, the mobile devices 120A,B and the locatiolning server 130. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 310, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 616. The network applications 612 can include the module. Other network applications 612 can include a web browser, a mobile application, an application that uses networking, a remote application executing locally, a network protocol application, a network management application, a network routing application, or the like.

The operating system 616 can be one of the Microsoft Windows® family of operating systems (e.g., Windows 95, 98, Me, Windows NT, Windows 2000, Windows XP, Windows XP x66 Edition, Windows Vista, Windows CE, Windows Mobile, Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A mobile device using a battery for processing location beacons, the mobile device communicatively coupled to a data communication network, to selectively process location beacons using mobile inbuilt sensors of the mobile device, the method comprising the steps of:

receiving transmission signals, via a first hardware network communications interface of the mobile device that is wirelessly coupled to the data communication network and powered by the battery, the transmission signals corresponding to a plurality of location beacons periodically sent by a nearby location device, wherein a location beacon contains a unique tag id that corresponds to a location that was previously configured;

selectively using battery power for processing the location beacon, via a battery saving controller coupled to a processor of the mobile device that is powered by the battery, the processing determining the unique tag id and an RSSI (radio signal strength indicator) value, wherein the battery saving controller deactivates location beacon processing to save power usage from the battery, responsive to detecting identical location beacons as indicated by the unique tag id over a time interval as an indication of no movement, and wherein the battery saving controller reactivates location beacon responsive to at least one of the sensors inbuilt to the mobile device detecting movement of the mobile device;

transmitting to a locationing server, via a second hardware network communications interface powered by the battery, the transmission comprising selective processing results of at least the unique tag id associated with the location beacon and the RSSI value associated with the location beacon relative to the mobile device;

receiving from the location server, via the second hardware network communications interface, a location determined by the location server using the unique tag id and the RSSI value; and outputting a current location of the mobile device to an application of the mobile device providing a service based on the current location.

2. The method of claim 1, wherein receiving transmission signals comprises wirelessly receiving Bluetooth LE beacons over a Bluetooth LE communication channel.

3. The method of claim 1, wherein the inbuilt sensors comprise at least one of: motion sensor, a gyro sensor, a GPS sensor, a position sensor, a light sensor and a temperature sensor.

4. A non-transitory computer readable medium in mobile device communicatively coupled to a data communication network, storing code to conserve battery power, when executed by a processor in mobile device using a battery for processing location beacons, by selectively processing beacons using mobile inbuilt sensors of the mobile device, the method comprising the steps of:

receiving transmission signals, via a first hardware network communications interface of the mobile device that is wirelessly coupled to the data communication network and powered by the battery, the transmission signals corresponding to a plurality of location beacons periodically sent by a nearby location device, wherein a location beacon contains a unique tag id that corresponds to a location that was previously configured;

selectively using battery power for processing the location beacon, via a battery saving controller coupled to a processor of the mobile device that is powered by the battery, the processing determining the unique tag id and an RSSI (radio signal strength indicator) value, wherein the battery saving controller deactivates location beacon processing to save power usage from the battery, responsive to detecting identical location beacons as indicated by the unique tag id over a time interval as an indication of no movement, and wherein the battery saving controller reactivates location beacon responsive to at least one of the sensors inbuilt to the mobile device detecting movement of the mobile device;

transmitting to a locationing server, via a second hardware network communications interface powered by the battery, the transmission comprising selective processing results of at least the unique tag id associated with the location beacon and the RSSI value associated with the location beacon relative to the mobile device;

receiving from the location server, via the second hardware network communications interface, a location determined by the location server using the unique tag id and the RSSI value; and outputting a current location of the mobile device to an application of the mobile device providing a service based on the current location.

5. A mobile device communicatively coupled to a data communication network, storing code to conserve battery power by selectively processing beacons using mobile inbuilt sensors of the mobile device, the mobile device comprising:

a first hardware network communications interface of the mobile device that is wirelessly coupled to the data communication network and powered by the battery to receive transmission signals, the transmission signals corresponding to a plurality of location beacons periodically sent by a nearby location device, wherein a location beacon contains a unique tag id that corresponds to a location that was previously configured;

a battery saving controller to selectively use battery power for processing the location beacon, via a battery saving controller coupled to a processor of the mobile device that is powered by the battery, the processing determining the unique tag id and an RSSI (radio signal strength indicator) value, wherein the battery saving controller deactivates location beacon processing to save power usage from the battery, responsive to detecting identical location beacons as indicated by the unique tag id over a time interval as an indication of no movement, and wherein the battery saving controller reactivates location beacon responsive to at least one of the sensors inbuilt to the mobile device detecting movement of the mobile device;

a second hardware network communications interface powered by the battery to transmit to a locationing server, the transmission comprising selective processing results of at least the unique tag id associated with the location beacon and the RSSI value associated with the location beacon relative to the mobile device, the second hardware network communications interface to receive from the location server, via, a location determined by the location server using the unique tag id and the RSSI value; and a locationing module, within the mobile device, to output a current location of the mobile device to an application of the mobile device providing a service based on the current location.

* * * * *